Nov. 16, 1965 J. G. LIVINGSTONE Re. 25,906

COVER AND CONTAINER

Original Filed Feb. 27, 1961 3 Sheets-Sheet 1

INVENTOR
JAY G. LIVINGSTONE

BY Gordon C. Mack

ATTORNEY

COVER AND CONTAINER

Original Filed Feb. 27, 1961 3 Sheets-Sheet 2

INVENTOR
JAY G. LIVINGSTONE

BY London C. Mack
ATTORNEY

COVER AND CONTAINER

Original Filed Feb. 27, 1961 3 Sheets-Sheet 3

INVENTOR
JAY G. LIVINGSTONE

BY Gordon C. Mack

ATTORNEY

United States Patent Office

Re. 25,906
Reissued Nov. 16, 1965

25,906
COVER AND CONTAINER

Jay G. Livingstone, 715 W. Market St., Akron, Ohio

Original No. 3,080,993, dated Mar. 12, 1963, Ser. No. 92,735, Feb. 27, 1961. Application for reissue Mar. 11, 1964, Ser. No. 363,316
14 Claims. (Cl. 220—24.5)

Matter enclosed in heavy brackets [ ] appears in the original patent but forms no part of this reissue specification; matter printed in italics indicates the additions made by reissue.

This invention relates to a container with an open top and a plastic cover therefor, with the edge of the cover engaged with the rim of the open top so that the two can be disengaged without damage to either the cover or the container. The cover and container can be engaged and disengaged as often as desired.

In a preferred form of the invention, the cover is provided with a groove around its edge, and the rim of the container is provided with groove-engageable means, and furthermore the cover is flexible and of such a size that when the groove is engaged with the groove-engageable means the surface of the groove nearest the center of the cover is pressed into air-tight contact with the groove-engaging means. The cover must be thick enough to be stiff enough to exert sufficient outward pressure to produce the desired sealing contact against the groove-engaging means. Plastics of different compositions will have to be of different thicknesses to exert the desired sealing pressure. The outer wall of the groove must be resilient enough to be lifted away from the groove-engaging means.

The area of the cover material inside of the groove is greater than the plane area bounded by the groove. Thus, the cover is not flat, but it is arched up or arched down within the space bounded by the groove. It is this arching that is the cause of the outward pressure against the groove-engaging means. This pressure may be increased by the use of strengthening ribs radiating from the center of the cover.

Covers which are arched up or down are subjected to being squeezed into the opening thereby creating an up or down rotating movement during the process of fitting the cover into the opening of the container after which it takes on a plane approximately horizontal to the base of the container.

Even though the cover is in a horizontal plane it exerts an outward pressure from the axis thereof on to the groove-engaging means thereby retaining tension on the groove-engaging means sufficient to maintain a tight seal regardless of the expansion or contraction of the cover material.

Since many products are cooked in the container after the cover has been installed, it arches up or down to provide greater flexibility of performance than the flat top design, especially in its application to the container. The performance from a handling standpoint can be equalized by heating the flat-top type cover before installation. The flat-top cover is advantageously heated before installation, in various situations, in order to provide an exceptionally tight seal. A vacuum is maintainable with the flat-top cover and also with the cover which is movable from a raised position to depressed position and vice versa.

The cover may be used for pressure packing and for vacuum (i.e. partial-pressure) packing. The pressure or vacuum may be created or intensified by depressing or lifting the center of the cover below or above the plane of the groove. The pressure within the package can be regulated by packaging an aqueous material while hot so that the "air" space within the package is filled with steam, and then cooling the covered container or allowing it to cool naturally to room temperature.

The effect on the pressure within the container, resulting from raising or lowering the center of the cover while the groove is in sealing contact with the groove-engaging means, will depend upon the size of the container and the volume of the "air" space within the container, and that may depend upon the size of the container. For instance, a one-pint container shaped like a tin can, with the groove of the cover engaged with groove-engaging means of substantially the same circumferential measurement as the container, when used for packaging a liquid material, will ordinarily be filled substantially to the rim with the liquid, providing an "air" space no greater than a thimbleful or two. The pressure in such an "air" space is determined in large measure by whether or not the center of the cover is raised or depressed after the cover is sealed on the container. But in a keg-sized drum, in which the "air" space measures several quarts, if the cover is only two or three inches in diameter, for instance, the pressure in the "air" space is not greately affected by raising or depressing the center of the cover after the cover has been sealed on the container.

The engagement means of the container is designed to accommodate the expansion of contraction of the cover material without lessening the efficiency of the seal. Provision of this type is incorporated in both the cover and container whereby either type of cover—flat top or the type which is arched up or down—is equally efficient from the seal standpoint.

The cover is advantageously formed with a raised knob, finger hold, or other handle near its center to facilitate lifting it from engagement with the container. If the portion of the cover in which the groove is located is raised above the portion of the cover surrounded by the groove, radial stiffening ribs extending inwardly from this raised area with their abutting ends pressing against said raised handle when the center of the cover is depressed, assisted in pressing the inner wall of the groove into sealing contact with the inner surface of the groove-engaging means, as will be more fully explained in what follows.

The cover may comprise a relatively thin flex line between its center and edge along which it is adapted to be flexed when the center of the cover is depressed from its raised position, or raised from its depressed position, or this flexing of the cover may occur throughout a circle of substantial width. The cover may be provided with radial pleats to facilitate its flexing when its center is pushed down and again when it is pulled up.

The distance between opposite portions of the groove is such that when a cover of a preferred type is on the container and its central postion is depressed, i.e. depressed below a straight-line connection between opposite portions of the groove-engageable means, the cover is under stress. As the central portion of the cover is lifted, one side is generally lifted before the other, and it passes through a position of greatest stress when the center is located more or less directly between the opposed portions of the groove-engageable means. As it is lifted further, the stress is released altogether. Because the cover is under stress when its central portion is depressed, the inner wall of the groove is pressed tight against the inner surface of the groove-engageable means, making an air-tight seal.

It is not necessary that the center of the cover be lifted directly up in removing it from the container, and in certain constructions this may be difficult or impossible. Usually, the cover will be lifted up obliquely so that one edge of it will become disengaged from the container first. Also, in replacing the cover on the container, it will ordinarily be desirable to press the cover obliquely after all portions of the groove have been placed over the groove-engageable means, so that the groove is engaged with one portion of said means first, and then progressively with the balance of said means. At a plant, where the cover is first placed on the container by mechanical means, the center of the cover may not be tilted as it is placed on the container. In some cases the cover may be heated and thereby enlarged before it is applied to the container, and then on cooling when in place its shrinkage to its original size will cause a tight seal between the groove and the groove-engaging means.

The contents of the container may be heated for sterilization just before putting the cover on, or while the cover is put on, or if the "air" space within the covered container is very small the covered container may be heated to sterilize the contents. The stiffer (longer chain) polyethylenes and polypropylenes will withstand sterilization temperatures.

Practically all canned food products are cooked in the container after the lid has been applied. The cooking temperatures vary from 70° to 260° F. High density polyethylene can be used at a temperature up to about 255° F.; polypropylene at higher temperatures.

Thus the cover is designed for use on containers of materials which are readily oxidized, or which take up moisture, or give up moisture, or are otherwise affected by contact with the air or some other atmosphere in which the container is stored. More particularly, the cover and container are designed for packaging materials such as jellies, preserves, fruits, relishes, mustard, olives, pickles, mayonnaise, dog food and other human and animal foodstuffs; medicinals, cigars, tobacco; pastes and emulsions, etc. which dry out on exposure to the atmosphere; sail, cookies, chemicals, etc. which absorb moisture when exposed to the atmosphere; solvent-containing compositions, such as lacquers, greases, dry-cleaning fluids, etc. which lose solvent on exposure to the atmosphere; paints, etc. which oxidize on exposure to the air, etc. etc., particularly when it is intended that only portions of the contents be removed from the container from time to time, because the cover is not damaged in removal from the container and it can readily be replaced in air-tight relation with the container again after each removal of a portion of its contents.

The use of container covers according to this invention eliminates the difficulties the housewife has in unscrewing lids from jars, prying lids off of jars, etc. during which the lids become distorted and cannot be reused. Also the use of the containers of this invention simplifies the closing of jars used for cold-packing, etc. by the housewife. It also eliminates the need for can openers.

It is further intended that aluminum containers replace metal cans as the aluminum container can be heated and taken direct to the table from the stove, and the container should be a receptacle suitable for use on the table. It is also intended that the covered containers of this invention be used for baby food, especially when traveling or on picnics with the baby along. The covered containers are also useful for dog and cat food, especially since an entire can is not always used for one feeding.

For general use a polyethylene cover is recommended and the container can be made of polyethylene or other plastic material, glass, tin, aluminum, etc. Covers of other plastics or like flexible materials such as pliable metals, aluminum (especially with edge coated with adhesive), paper, etc. may be used. The inside of aluminum containers can be coated to prevent discoloration of container contents.

The accompanying drawings show a variety of different designs of groove-engaging means, etc. Stiffening ribs are used on a preferred form of cover. The invention will be further described in connection with the accompanying drawings, in which—

FIGURES 8 to 14 illustrating the engagement of various groove-engaging means with grooves in full lines and partial disengagement therefrom in dash lines;

FIGURES 1–21 illustrate circular covers on circular containers, although the grooves and groove-engageable means and other features of these structures are equally applicable to covers and containers of other shapes such as square, oblong, rectangular, etc. covers and containers.

Figure 1:
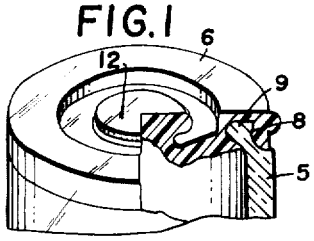
FIG. 1 is a view in perspective of the combination of a container and cover, partly broken away, to show groove-engageable means on the container engaged in a groove in the outer edge of the centrally depressed cover.
Figure 2:
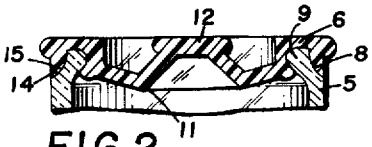
FIG. 2 is a vertical section through the same, showing the cover engaged with the container.
Figure 3:
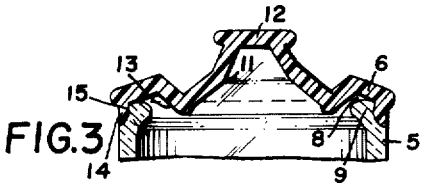
FIG. 3 is a vertical section of the same with the cover lifted and partly disengaged from the container.

The container 5 of FIGURES 1–3 is illustrated as being made of glass or china or earthenware, but might as well be made of metal or plastic. The cover 6 is of polyethylene. The groove 8 in the cover engages the groove engageable means 9 at the rim of the container. The cover is formed with the definite flex line 11 and there is a knob 12 at the center of the cover to facilitate lifting the cover from the container.

The straight-line distance from the center of the cover to the surface of the inner wall 13 of the groove, when the cover is not under stress or strain, is less than the actual expanse of material between the center of the cover and the wall 13. When the knob 12 is depressed so that the flex line 11 is below the plane of the nearest two points of the means 9 on the cover, the wall 13 of the groove is pressed into tight engagement with the means 9. In this position the composition of the cover material is under compression so that a tight seal is formed between the inner wall of the groove and the means 9 on the container. The inner surface of the groove-engaging means on the cover slants outwardly, so that as the cover presses outwardly against it, the cover tends to slide down over it, tending to pull the outer wall of the groove tight against the groove-engaging means.

When the knob 12 is lifted the cover material is again compressed until the flex line 11 passes through the plane in which opposite portions of the means 9 are nearest one another. Then it quickly snaps upwardly as the stress is relieved and the lip 13 is snapped inwardly away from the means 9, and the cover is disengaged from the means 9 and can readily be lifted from it.

After a desired amount of material has been removed from the container the cover is replaced by fitting the groove over the means 9, and then depressing the knob 12. The outer wall 14 of the groove is forced over the means 9, and by depressing the knob 12 so as to press the flex line 11 below the position in which the cover is under greatest stress, the wall 13 of the groove is again pressed into air-tight contact with the means 9. As explained, this pulls the wall 14 into tight contact with the outer wall 15 of the bead.

The ease with which the center of the cover can be raised or depressed will depend upon the volume of the "air" space within the cover. If the "air" space is small, the cover may be attached to the container while hot, with the cover raised, and the center may be depressed as the container and its contents cool off. Alternatively, the cover may be put on the container with the cover depressed, then when the container and contents are heated to sterilize them, the center of the cover may rise up; and it may become depressed again when the container and contents cool off.

Although the wall 5 will generally be the straight side wall of a container, it may be the wall of the neck of a bottle or the like which is of less diameter than the diameter of the body of the container.

Figure 4:
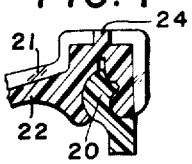
FIGS. 4 to 14 are details of different groove and container engagements.

In FIGURE 4, the grip of the groove about the groove-engageable means 20 in increased by the ribs 21 on the cover 22. There are several such ribs radiating from the center (or near the center of the container) similar to those illustrated in FIGURES 15 and 22, although the ribs of the container of FIGURE 4 are interrupted by the circular rib 24 that encircles the container. The radial ribs stiffen the cover and form a tighter seal between the groove and the groove-engageable means.

Figure 5:
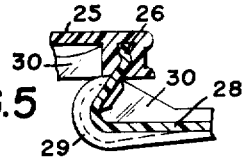

The structure of FIGURE 5 is similar to that of FIGURES 15–17, below, except the center of the cover is provided with a circular opening. The cap 25 is snapped on to the stiff rim 26 of this opening. The cap 25 can be removed and replaced for removal of a small portion of the contents of the container without removing the cover 28 from the container (not shown). The plastic of the cover is pleated at 29 to facilitate expansion and contraction as it is placed on the container and removed from it. The stiffening ribs 30 limit the amount the center of the cover can be pushed down, as explained in greater detail in connection with FIGURES 15–17.

Figure 6:
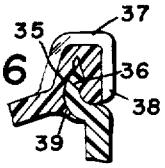

FIGURE 6 illustrates a groove 35 and groove-engageable means 36 of different design. The stiffening rib 37 assists in making a tight seal between the cover and the container when the center of the cover is depressed. It also provides a lip 38 to facilitate removal of the cover from the container. The lip 38 is pressed into sealing engagement with the means 36 when the center of the cover is depressed. It is withdrawn from engagement with the undersurface of the groove-engageable means 36 when the cover is lifted. The ribs 37 do not extend inwardly across the expanse of the cover. The sharpness of the means 36 prevents slippage of the rim of the cover over it as the center of the cover is depressed and this causes a tight seal to be formed between the outer wall of the means 36 and the inner wall of the groove in the cover. The lip 39 forms a seal against the inner surface of the means 36.

Figure 7:
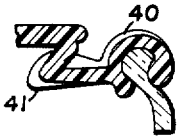

FIGURE 7 illustrates a cover and container with groove and groove-engageable means of a different design. The ribs 40 stiffen the groove and the outer portion of the cover, and the ribs 41 stiffen the flex line. There are a plurality of ribs 40 and 41 radiating equidistantly from the center of the cover. These ribs tend to hold the cover in its unstressed position, and when the cover is forced into a different position (as when its central portion is depressed) they increase the stress to which the cover material is subjected.

Figure 8:
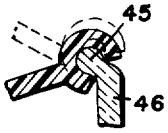
Figure 9:
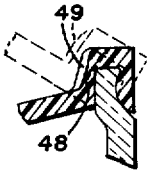
Figure 10:
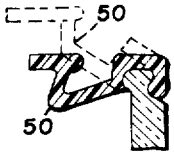

FIGURES 8–10 illustrate grooves and groove-engageable means of different shapes. The bead or groove-engageable means 45 of FIGURE 8 is inclined inwardly from the wall 46. The wall 48 of the groove in the cover shown in FIGURE 9 is stiffened by the radial ribs 49 so that as the cover is lifted, the inner wall of the groove tends to separate from the groove-engageable means as a unit—not progressively. The full lines indicate the angle of the cover when depressed; and the dash lines indicate the angle of the cover when wholly or partly lifted to disengage the groove from the cover. FIGURE 10 illustrates the flexing of the cover along the flex line 50.

Figure 11:
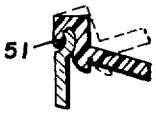

FIGURES 11–14 illustrate a cover engaged with a flexible sheet-metal container. In FIGURE 11, the groove is adapted to engage an S-curve bend 51 in the edge of the container. The full line shows the angle of the cover when depressed. The dash line shows the angle of the cover when the groove is being disengaged, from the container.

Figure 12:
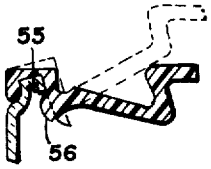

FIGURE 12 shows a container with an inwardly bent lip 55. In the depressed position of the cover (shown in full lines) the inner wall of the groove at 56 is engaged under the underside of the lip 55. As the cover is lifted (dash lines) this wall is disengaged from the lip.

Figure 13:
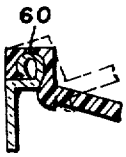
Figure 14:
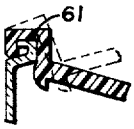

FIGURES 13 and 14 show the lips of the containers bent to form what are in effect, beads 60 and 61. The full-line showings of the covers illustrate the inner wall of each groove engaged with each bead, and the dash lines illustrate the disengagement of the cover as the cover is lifted.

FIGURES 15 to 19 show various views of a cover with radiating ribs and locking means to engage these ribs when the center of the cover is depressed. The cover is designed for a circular opening in a container, but the same principle may be employed for covers and containers of different shapes.

The cover 70 is provided on its undersurface around its outer edge with a groove 71 which engages the bead 72 on the container 73. The rounded bead 74 on the edge of the cover travels over the outer surface of the container as it is caused to expand and contract by heating and cooling. Radiating ribs 75 stiffen the cover. When the central knob 76 stiffened by ribs 77 is depressed so that the main portion of the cover is brought below the plane where the knob and ribs are nearest one another, the flaring inner ends 78 of the ribs 75 become located between the spacing ribs 79 which hold the ribs 75 substantially perpendicular and prevent them from flexing to one side or the other. Ribs 78 and 79 stiffen the cover, and the differently stiffened portions may flex independently of one another. The outer wall of the groove 71 stretches as the center of the cover is depressed. Ordinarily the central portion of the cover is depressed so that the cover slants downwardly and inwardly from the groove-engaged rim of the container, but the ribs 75 prevent this, as shown in FIGURE 17.

Although this cover may be used on a container of any size, and may for example be used to cover the end of the neck on a smaller or larger bottle-shaped container, it is designed particularly for use on a cylindrical container of aluminum or other construction which holds about one-half pint to a pint or quart, with groove-engaging means at the top of its wall. The container may contain a fruit in canning juice and the conveyor may be applied while the container and contents are at sterilization temperature with the center of the cover raised, or even with it depressed. The cover may even be put on the container before it is heated, but is advantageously put on the container with the center raised before sterilization is completed; then, on cooling, the center becomes depressed.

The ribs 75 stiffen the cover and, as shown in 78, the web of the cover between these ribs is advantageously full (as indicated clearly in FIGURE 18) to facilitate flexing, as required, as indicated by the accordion-like radial pleats 70'. As the cover is depressed from the position shown in FIGURE 16 to the position shown in FIGURE 17, or with the cover further depressed so that the cover slants down more toward its center, the fullness of the cover is increased.

The flexing of the cover can be controlled by varying the thickness of the cover in different areas, and by varying the thickness or depth of the stiffening ribs. It is not necessary that the ribs be continuous. In that case, the different sections may angle apart as the center of the cover is raised. In order to insure that adjoining sections are returned to abutting relation when the center of the cover is again depressed, the edges that are to abut one another may be thickened, or one edge may be bifurcated to receive the other edge.

Figure 21:
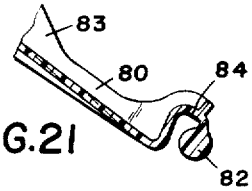
FIG. 21 is a section through the same with the cover lifted.
Figure 20:
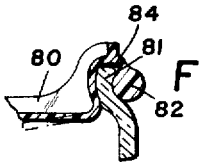
FIG. 20 is a section through a modified form of groove engaged with groove-engaging means.

FIGURES 20 and 21 show a modified form of groove and groove-engaging means for a similar cover and container arrangement. FIGURE 20 shows the cover 80 depressed with the groove locked around the rim 81 of the container. FIGURE 21 shows the cover lifted. The difference in the positions of the bead 82 in the two views shows how the depression of the central portion of the cover pulls the outer edge of the cover against the rim 81 of the container. The rib of this container is provided with a flared inner end 83 for pressure against a knob at the center of the cover, as fully explained in connection with FIGURES 15–17. The gasket 84 is seldom necessary but may be used to make a tight seal between the cover and the rim 81.

Figure 15:
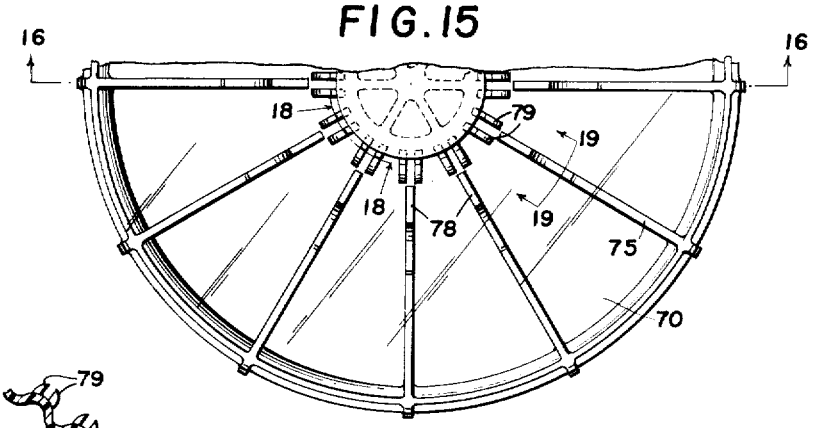
FIG. 15 is a plan view of a ribbed cover with locking means.
Figure 18:
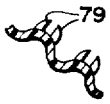
FIG. 18 is a section on the line 18—18 of FIGURE 15.
Figure 19:
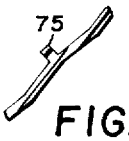
FIG. 19 is a section on the line 19—19 of FIGURE 15.
Figure 16:
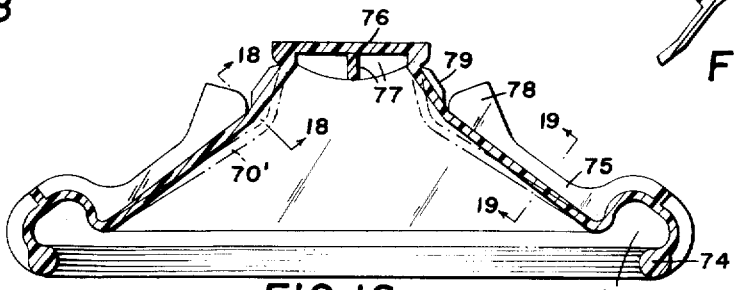
FIG. 16 is a vertical section through the same on the line 16—16 of FIGURE 15, with the cover lifted.
Figure 17:
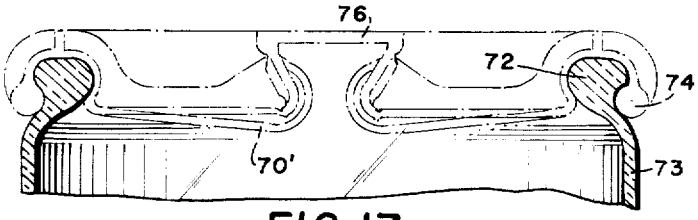
FIG. 17 is a section through the same showing the groove engaged with the groove-engageable means.
Figure 22:
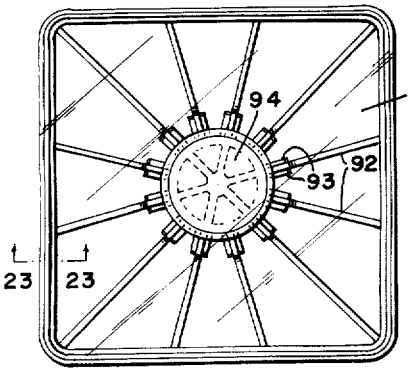
FIG. 22 is a plan view of a square ribbed cover with rib-locking means.

FIGURE 22 shows a cover 90 similar to the circular cover of FIGURES 15–17, for use on a square container. The edge of the cover is provided with a suitable groove 91 to be engaged with groove-engaging means on the rim of the container. The inner ends of the ribs 92 are guided by ribs 93 so that their ends press against the knob 94 at the center of the cover as it is depressed.

Figure 24:
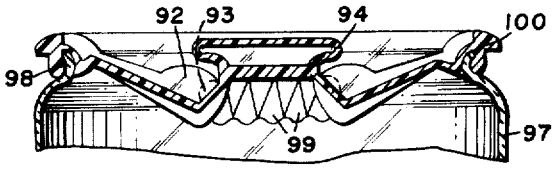
FIG. 24 is a section of the cover of FIGURES 22 and 23 on a container.

FIGURE 24 shows the tin, aluminum, etc. container 97 terminating in a thin upwardly directed lip 98. It clearly shows how the downward flexing of the cover forms radial accordion-like pleats 99. The lip 100 on the cover facilitates its removal from the container.

Figure 25:
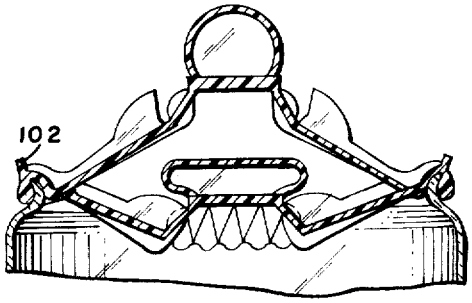
FIG. 25 shows the same cover as FIGURE 24, both in a depressed and raised position except that the lip is of somewhat changed design.

FIGURE 25 shows the same container and cover, both in a depressed and raised position except that the rim of the cover design is differently constructed and the radial ribs on the cover are reinforced by the circumferential rib 102.

Figure 26:
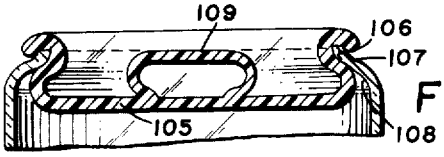
FIG. 26 is a flat-top cover.

FIGURE 26 is a flat-top design in which the edges of the cover 105 extend upwardly and curve over the lip 106 which surrounds the cover. The lip is turned in to provide surfaces 107 and 108 on the outside and inside of the cover for expansion and contraction of the lid as it is heated and cooled, or as pressure or partial vacuum is created within the container. Thus the closed container can be heated for sterilization or other purposes, or the container can be closed immediately after being heated for sterilization, and this will suck the cover down into the container. Furthermore, the container with a foodstuff in it can be packaged at the store and heated by the housewife without removing the cover. Furthermore, after removing a part of the contents the housewife can replace the cover and reheat the contents without removing the cover, if this becomes desirable. The handle 109 is provided to facilitate removal of the cover.

Figure 27:
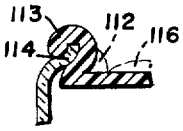
FIG. 27 is an alternative view showing reinforcing ribs.

The flat-top cover need not curve at the edges into the portion which surrounds the lip 106 but can be more angular, as illustrated in FIGURE 27. Likewise, the cover of FIGURE 26 can be reinforced with ribs as indicated in FIGURE 27 if this becomes desirable. The S-configuration of the lip of the container can be extended with the smooth upward curve to provide for further expansion and contraction of the cover if this becomes desirable.

The cover 105 being of larger diameter than the smallest diameter of the lip or rim 106 *and being located below said portion of smallest diameter* exerts a constant downward pull on the portion of the cover beyond that portion of the cover which is of largest diameter. *On expansion of the area of the fitment which covers the opening in the container or contraction of the rim, said portion of the fitment below the portion of the rim of smallest diameter expands toward the container and pulls the bottom of the groove against the edge of the rim. On the other hand, on expansion of the rim or contraction of the area of the fitment which covers the opening in the container, the bottom of the groove is pulled into firmer contact with the edge of the rim.* [In this way the outer wall of the groove of the cover which embraces the lip is maintained at all times in sealing contact with the outer surface of the rim near its edge. Also, the outer surface of the cover between the groove and the portion of largest diameter is at all times maintained in sealing contact with the inner wall of the curved portion of the rim. Thus there is a double seal between the cover and the rim of the container, one of the seals being on the outer surface of the rim and the other seal being on the inner surface of the rim.]

[If the cover has a different coefficient of expansion from the container and a change in temperature causes a change in the dimensions of the cover, contraction of the cover causes the outer wall of the groove in the cover to pull against the rim and expansion of the cover causes the inner wall of the groove and the portion of the cover between it and the portion of largest diameter to press outwardly, forming a seal between the cover and the inner wall of the rim.]

FIGURE 27 shows a detail modification of the structure shown in FIGURE 26. The rib 112 stiffens the portion 113 which engages the lip 114 on the container to bolster tension on the seal by making the cover somewhat more rigid in this area. Rib 116 stiffens the cover. The ribs 116 are illustrative of radial ribs which extend outwardly from the central portion of the cover as in the other illustrations.

Figure 28:
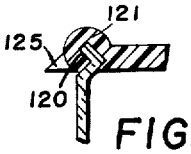
FIG. 28 is a detail in section showing a modified container and cover structure.

FIGURE 28 is a detail showing a different type of lip 120 on the container engaged by the grooved bead 121 which surrounds the cover. The thumb tab 123 preferably extends only about ½ or 1 inch around the circumference of the cover but may extend all the way around it.

Figure 29:
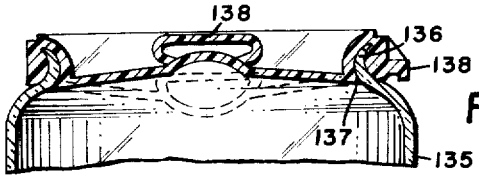
FIG. 29 is a section through a still further modification.
Figure 23:
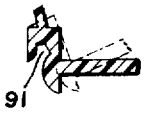
FIG. 23 is a section on the line 23—23 of FIGURE 22.

FIGURE 29 shows a metal or other container 135 with an outwardly curved lip 136 around the opening in it. The cover provides for only slight movement between the raised position shown in full lines and the depressed position shown in dash lines. When the cover is depressed, the lip 137 presses tight against the underside of the lip, making a tight seal. Also, because there is no possibility of the cover sliding over the lip 136 when depressed, the outer wall of the groove binds against it. The ring 138 is provided as means for lifting the cover. The thumb tab 139 facilitates lifting the edge of the cover from the container. It extends only ½ inch to 1 inch circumferentially of the cover.

The seal of this invention remains good even though there are various elements which affect the characteristics of the material from which the cover is made. Since the design of the container includes provision for expansion or contraction of the cover as a whole, and especially the movement incidental to that section in the attaching area, provision should be made for the intended expansion or contraction before attaching the cover. If expansion is contemplated, the cover should be depressed to a convex configuration. After the cover has been forced below dead center and is convex, it exerts pressure outwardly even though the pressure within the covered container changes as the temperature becomes hotter or colder, and there is adequate leeway built into wrap-around cover attachment means on the container to accommodate such movement of the cover as is required by expansion or contraction, with no ill effect on the efficiency of the seal.

This particular cover can be made flat from side to side (flat top). It can be heated before installation;

however, it should still be a press fit while hot, which will provide tight seal when forced on to the container; very tight after cooling.

Modifications will suggest themselves to the man skilled in the art. The cover may protrude outwardly around its whole perimeter to serve as a lip against which pressure is to be applied to lift the cover from the container, or a single such lip may be provided. *The container walls may be made of other materials than shown in the drawings.*

The invention is covered in the claims which follow.

What I claim is:

1. In combination, a container and a flexible plastic cover therefor, the container having an opening in it which is located in one plane with groove-engaged means adjacent the rim of the container wall at said opening, the cover comprising adjacent its edge a groove engaging said *groove* [grove]-engaged means, the area enclosed by the expanse of the cover within the inner wall of the groove when not under stress being greater than the planar area defined by the groove-engaged means, so that the center of the cover can be moved between (1) a lower position in which the portion of the cover adjacent the groove slants down into the container, and (2) an upper position in which the portion of the cover adjacent the groove slants upwardly from the container, the groove being separable from the groove-engaged means by lifting the cover from the container.

2. The combination of claim 1 in which outwardly projecting radial ribs stiffen the cover at the groove.

3. The combination of claim 1 in which outwardly projecting radial ribs stiffen the cover between the groove and its center.

4. The combination of claim 1 in which the portion of the cover which contains the groove is raised above the area of the cover which it surrounds, the central portion of the cover is raised, and stiffening ribs on top of the cover radiate inwardly from said first raised area, with the inner ends of said ribs abutting the second raised area when the cover is depressed whereby the inner wall of the groove is pressed against the outer surface of the groove-engaging means.

5. A container with an opening therein, the wall of the container having a rim which is curved in from the wall toward the opening and then up, a cover of plastic with a coefficient of expansion which is different from that of the rim of the container, the cover having a groove adjacent the outer edge thereof, both the inner and outer walls of which groove are in contact with the rim and the edge of the rim is adjacent the bottom of the groove, the cover being in contact with the inner surface of the rim below and inwardly of the part of said curved-in portion of the rim which is of smallest diameter, whereby on change in the dimensions of the cover due to changes in temperature contraction of the cover causes a pull against the rim of the portion of the outer wall of the groove adjacent said bottom, and expansion of the cover causes the inner wall of the groove and the portion of the cover immediately inwardly adjacent it to be pushed outwardly against the inner wall of the rim thereby maintaining a tight seal between the groove and the rim at all times.

6. The container-and-cover assembly of claim 5 with radial ribs on the cover which stiffen it.

7. The container-and-cover assembly of claim 5 in which substantially radial stiffening ribs on the outer surface of the cover extend across said portion of the cover of larger diameter and join portions of smaller diameter on both sides thereof.

8. The container of claim 5 in which the rim curves out from said upwardly curved portion.

9. The container-and-cover assembly of claim 5 with a gasket in the bottom of the groove.

10. The method of making the assembly of the two elements of a cover and container defined in claim 5, which method comprises forming the assembly with one of said elements at a substantially different temperature from the other and then bringing the two elements to the same temperature.

11. A container with an opening therein having a rim which is curved in from a wall thereof toward the opening and extends upwardly from the curved-in portion, and a plastic cover having a groove adjacent its outer edge which groove embraces the edge of said rim with the edge of the rim adjacent the bottom of the groove, the cover inwardly adjacent the groove being of larger diameter than the smallest diameter of said inwardly curved portion of the rim and being in pressure contact with at least a portion of the inner surface of said inwardly curved portion of the rim whereby the portion of the cover of largest diameter below the opening exerts a constant downward pull on the portion of the cover above said portion of largest diameter and the outer wall of the groove is maintained in sealing contact with the outer surface of the rim near its edge, and the outer surface of the cover between the groove and said portion of largest diameter is maintained in sealing contact with a curved portion of the rim above said portion of largest diameter.

*12. A container with an opening therein, the wall of the container having a rim, the inner surface of the container immediately adjacent the edge of the rim being curved in toward the opening and then up,*

*a fitment,*

*the fitment having a groove on its under surface adjacent the outer edge thereof, which groove embraces the edge of the rim with the edge of the rim in snug contact with the bottom of the groove and the inner surface of that portion of the outer wall of the groove which is adjacent the edge of the rim fitting against the other wall of the rim,*

*with the fitment being in contact with the inner surface of the rim from the edge thereof to the part of said curved-in portion of the rim which is of smallest diameter,*

*with a portion of the fitment extending below this portion of the rim which is of smallest diameter and being free to expand outwardly toward contact with the container below said portion of the rim of smallest diameter,*

*whereby on expansion of the area of the fitment which covers the opening in the container or contraction of the rim, said portion of the fitment below the portion of the rim of smallest diameter expands toward the container and pulls the bottom of the groove against the edge of the rim,*

*and on expansion of the rim or contraction of the area of the fitment which covers the opening in the container, the bottom of the groove is pulled into firmer contact with the edge of the rim.*

*13. A container with an opening therein, the wall of the container having a rim, the inner surface of the container immediately adjacent the edge of the rim being curved in toward the opening and then up,*

*a fitment,*

*the fitment having a groove on its under surface adjacent the outer edge thereof, which groove embraces the edge of the rim with the edge of the rim in snug contact with the bottom of the groove and the inner surface of that portion of the outer wall of the groove which is adjacent the edge of the rim fitting against the other wall of the rim,*

*with the fitment being in contact with the inner surface of the rim from the edge thereof to the part of said curved-in portion of the rim which is of smallest diameter,*

*with a portion of the fitment extending below this portion of the rim which is of smallest diameter and being free to expand outwardly toward contact with*

*the container below said portion of the rim of smallest diameter,*

*whereby on expansion of the area of the fitment which covers the opening in the container or contraction of the rim, said portion of the fitment below the portion of the rim of smallest diameter expands toward the container and pulls the bottom of the groove against the edge of the rim.*

*14. The combination of claim 1 with a gasket between the groove and the groove-engaging means.*

References Cited by the Examiner

The following references, cited by the Examiner, are of record in the patented file of this patent or the original patent.

UNITED STATES PATENTS

| | | | |
|---|---|---|---|
| 905,652 | 12/1908 | Comings. | |
| 2,661,128 | 12/1953 | Rieke | 220—85 |
| 2,671,574 | 3/1954 | Wolfe | 220—24.5 |
| 2,913,140 | 11/1959 | Vuillemenot | 220—60 |
| 2,947,463 | 8/1960 | Conklin | 229—43 |
| 2,982,436 | 5/1961 | Hitov | 220—60 |
| 3,116,846 | 1/1964 | Salminen | 215—41 |

FOREIGN PATENTS

| | | |
|---|---|---|
| 153,832 | 3/1956 | Sweden. |

THERON E. CONDON, *Primary Examiner.*

GEORGE O. RALSTON, *Examiner.*

GEORGE T. HALL, *Assistant Examiner.*